US011952826B2

(12) United States Patent
Napier et al.

(10) Patent No.: US 11,952,826 B2
(45) Date of Patent: Apr. 9, 2024

(54) MAGNETIC CLOSURE BUMPERS

(71) Applicant: Cortex, LLC, Knoxville, TN (US)

(72) Inventors: Rodney Napier, Knoxville, TN (US); Zachary P. Beard, Jefferson City, TN (US)

(73) Assignee: Cortex, LLC, Knoxville, TN (US)

( * ) Notice: Subject to any disclaimer, the term of this patent is extended or adjusted under 35 U.S.C. 154(b) by 0 days.

(21) Appl. No.: 18/456,600

(22) Filed: Aug. 28, 2023

(65) Prior Publication Data

US 2024/0076922 A1 Mar. 7, 2024

Related U.S. Application Data

(60) Provisional application No. 63/401,828, filed on Aug. 29, 2022.

(51) Int. Cl.
*E05F 5/02* (2006.01)

(52) U.S. Cl.
CPC ............ *E05F 5/02* (2013.01); *E05Y 2201/46* (2013.01); *E05Y 2900/20* (2013.01); *E05Y 2900/602* (2013.01)

(58) Field of Classification Search
CPC .......... E05C 17/46; E05C 17/52; E05C 17/60; E05C 17/64; E05F 5/00; E05F 5/02;
(Continued)

(56) References Cited

U.S. PATENT DOCUMENTS 2,277,057 A 3/1942 Bach
2,472,397 A 6/1949 Bennett
(Continued)

FOREIGN PATENT DOCUMENTS

CA 2957945 A1 8/2018
CN 201159001 Y * 12/2008
(Continued)

OTHER PUBLICATIONS

Epacenet machine translation WO2006094491A1 Sep. 14, 2006 description and claims (Year: 2023).
(Continued)

*Primary Examiner* — Chuck Y Mah
(74) *Attorney, Agent, or Firm* — Luedeka Neely, P.C.

(57) ABSTRACT

A magnetic closure bumper assembly is used in conjunction with a movable structure that engages a stationary structure. The magnetic bumper assembly includes a first closure bumper and a second closure bumper. The first closure bumper includes a first bumper casing in which a first magnet is disposed. The first bumper casing has a mounting surface configured for attachment to the movable structure and an engagement surface opposing the mounting surface. The second closure bumper includes a second bumper casing in which a second magnet is disposed. The second bumper casing has a mounting surface configured for attachment to the stationary structure and an engagement surface opposing the mounting surface. Magnetic attraction between the first and second magnets causes the first closure bumper to be attracted to the second closure bumper, thereby urging the engagement surface of the first bumper casing to removably contact the engagement surface of the second bumper casing as the movable structure is moved toward the stationary structure.

10 Claims, 2 Drawing Sheets

(section A-A)

(58) Field of Classification Search
CPC .... E05F 5/06; E05Y 2201/46; E05Y 2201/40; E05Y 2201/224; E05Y 2201/222; E05Y 2900/20; E05Y 2900/132; E05Y 2900/602; Y10T 16/61; Y10T 16/625; Y10T 16/628
See application file for complete search history.

(56) References Cited

U.S. PATENT DOCUMENTS 2,496,691 A * 2/1950 Berry ...................... E05C 17/56 16/404
2,602,182 A 7/1952 Johnson
2,638,620 A 5/1953 Civitelli
2,693,382 A 11/1954 Teetor
2,813,293 A 11/1957 Civitelli
2,813,294 A 11/1957 Civitelli
2,815,236 A * 12/1957 Lowinski ................ E05C 17/56 52/DIG. 4
2,906,553 A 9/1959 Wilson
3,016,563 A 1/1962 Jong
3,135,012 A 6/1964 Wessel
3,157,906 A 11/1964 Wolf
3,163,453 A 12/1964 Stephens
3,174,179 A 3/1965 Benson
3,187,372 A 6/1965 Parsons
3,261,631 A 7/1966 Alessi
3,273,926 A 9/1966 Pietsch
3,288,511 A 11/1966 Tavano
3,331,043 A 7/1967 Orzabal
3,562,850 A 2/1971 Eliason et al.
3,636,727 A 1/1972 James
3,913,171 A 10/1975 Reid
3,919,743 A 11/1975 Cutler
3,971,100 A 7/1976 Anop
3,971,581 A 7/1976 Montgomery
4,058,335 A 11/1977 Abe
4,099,755 A 7/1978 Anderson
4,212,392 A 7/1980 Mckenzie
4,259,762 A 4/1981 Civitelli
4,505,502 A * 3/1985 Tomita .................... E05C 17/56 292/347
4,527,303 A 7/1985 Civitelli
4,669,766 A * 6/1987 Hanchett, Jr. ........... E05C 17/56 403/90
4,754,532 A 7/1988 Thomson et al.
4,858,273 A 8/1989 Civitelli
4,995,655 A * 2/1991 Freeman ................. E05C 17/56 292/DIG. 19
4,998,941 A 3/1991 Jack
5,010,622 A 4/1991 Morita
5,077,950 A 1/1992 Bretches et al.
5,237,724 A 8/1993 Lee
5,376,910 A 12/1994 Geringer et al.
5,473,841 A 12/1995 Grillo
5,581,844 A 12/1996 Raheb et al.
5,727,289 A 3/1998 Reder
5,887,917 A * 3/1999 Luciana .................. E05C 17/56 335/286
6,182,336 B1 2/2001 Bauer
6,226,842 B1 5/2001 Wong
7,775,567 B2 8/2010 Ligtenberg et al.
8,016,330 B2 9/2011 Fullerton et al.
8,029,076 B2 10/2011 Greiner
8,225,562 B2 7/2012 Parker
8,434,201 B2 5/2013 Wang
8,801,054 B2 8/2014 Ligtenbert et al.
8,864,188 B2 * 10/2014 Redgrave ................ E05C 19/16 292/DIG. 10
8,955,891 B2 2/2015 Millsap
9,033,377 B2 5/2015 Day et al.
9,297,189 B2 3/2016 Ho
9,689,527 B2 6/2017 Christopher et al.
9,730,534 B2 8/2017 Pierson
9,756,905 B2 9/2017 Bielecki et al.
10,173,292 B2 1/2019 Fullerton et al.
10,441,096 B2 10/2019 Chung et al.
10,704,306 B2 7/2020 Schartner et al.
11,168,499 B2 11/2021 Pavlow
11,414,906 B1 8/2022 Tallent
2004/0148734 A1 * 8/2004 Chiu ....................... E05C 17/56 16/82
2005/0050681 A1 3/2005 Schlitter
2006/0006674 A1 1/2006 Kang et al.
2006/0125247 A1 6/2006 Furia
2006/0236502 A1 * 10/2006 Chiang ................... E05C 17/56 16/82
2007/0000775 A1 1/2007 Nakahara et al.
2007/0163077 A1 * 7/2007 Yang ......................... E05F 5/06 16/85
2008/0087053 A1 4/2008 Frazier et al.
2008/0295283 A1 12/2008 Tice
2009/0027149 A1 1/2009 Kocijan
2009/0273194 A1 11/2009 Patterson
2010/0162523 A1 * 7/2010 Ferguson ................ E05C 17/56 16/82
2010/0236167 A1 9/2010 Parker
2011/0018659 A1 9/2011 Fullerton et al.
2012/0066873 A1 8/2012 Lauder et al.
2013/0255033 A1 10/2013 Vu
2014/0225385 A1 8/2014 Millsap
2016/0244981 A1 8/2016 Klein
2017/0086328 A1 3/2017 Ly et al.
2018/0128025 A1 5/2018 Estrada
2020/0318423 A1 10/2020 Napier et al.
2020/0340507 A1 * 10/2020 Kehdy ................. F16M 13/022
2021/0134501 A1 * 5/2021 de la Rosa ................ H01F 7/04

FOREIGN PATENT DOCUMENTS

CN 101994444 A 9/2014
CN 107165515 A * 9/2017 ............. E05C 17/56
CN 206874098 U * 1/2018
CN 108118989 A * 6/2018
CN 209568834 U * 11/2019
CN 209799664 U * 12/2019
CN 111520012 A * 8/2020
CN 111677392 A 9/2020
CN 112610089 A * 4/2021
CN 215369287 U * 12/2021
CN 215369287 U 12/2021
CN 111577039 B 1/2022
DE 2455520 A1 5/1976
DE 3041572 A1 6/1982
DE 3107195 A1 9/1982
DE 29918117 U1 12/1999
DE 202005016584 U1 1/2006
DE 202009014676 3/2010
DE 102009049005 A1 7/2021
EP 0490663 B1 8/1996
EP 1959087 A1 8/2008
EP 2620571 A2 7/2013
FR 1179194 A 5/1959
GB 2348923 A * 10/2000 ......... A45C 13/1069
GB 2452146 A 2/2009
JP s58105524 B 6/1986
JP h10159425 A 6/1998
JP 2002271052 A 9/2002
JP 2008019645 B 9/2011
KR 20090110604 A 10/2009
WO 9406319 A1 3/1994
WO WO-03060269 A1 * 7/2003 ............. E05C 17/54
WO 2006094491 A1 9/2006
WO 2013057344 A1 4/2013

(56) References Cited

FOREIGN PATENT DOCUMENTS

| | | | |
|---|---|---|---|
| WO | 2018191809 | A1 | 10/2018 |
| WO | 2019239276 | A1 | 12/2019 |

OTHER PUBLICATIONS

Espacenet machine translation JP2002271052A Sep. 20, 2002 description and claims (Year:2023).

* cited by examiner (section A-A)

(section A-A)

MAGNETIC CLOSURE BUMPERS

FIELD

This invention relates to the field of door and furniture hardware. More particularly, this invention relates to a door or drawer closure mechanism that incorporates magnetic components.

BACKGROUND

Doors today are often equipped with standard bumpers designed to provide a quiet closure. A chief complaint among these existing technologies is that they result in repeated drumming as the door comes to rest in a closed position or in vibration in the door itself, neither of which is particularly quiet.

SUMMARY

The aforementioned problems and more are solved by the magnetic closure bumper system described herein. The system provides an aesthetically pleasing, functionally simple, yet highly effective solution designed to ensure a quiet, tight closure every time a door, drawer, chest lid, or other enclosure is closed. Moreover, the system is designed to work with many types of closures available on the market today.

As described herein, the system involves magnetic and/or ferromagnetic materials that are affixed to or embedded within various sliding or shutting components, including the frames, doors and drawers of cabinetry, the lids of chests, and other containers. The system is also designed to be highly customizable to fit each consumer's particular needs and circumstances, and to be adjustable based not only on the type of door or closure layout, but also on the consumer's desired positioning.

Embodiments described herein are directed to a magnetic closure bumper assembly for use in conjunction with a movable structure that engages a stationary structure. The magnetic bumper assembly comprises a first closure bumper and a second closure bumper. The first closure bumper includes a first bumper casing in which a first magnet is disposed. The first bumper casing has a mounting surface configured for attachment to the movable structure and an engagement surface opposing the mounting surface. The second closure bumper includes a second bumper casing in which a second magnet is disposed. The second bumper casing has a mounting surface configured for attachment to the stationary structure and an engagement surface opposing the mounting surface. Magnetic attraction between the first and second magnets causes the first closure bumper to be attracted to the second closure bumper, thereby urging the engagement surface of the first bumper casing to removably contact the engagement surface of the second bumper casing as the movable structure is moved toward the stationary structure.

In some embodiments, one or both of the first and second bumper casings have a semi-elliptical shape and one or both of the first and second magnets have a cylindrical shape.

In some embodiments, one or both of the first and second bumper casings have a semi-toroidal shape and one or both of the first and second magnets have an annular shape.

In some embodiments, the first and second bumper casings are formed from polyurethane.

In some embodiments, the first magnet is embedded within the first bumper casing and the second magnet is embedded within the second bumper casing.

In some embodiments, the force of magnetic attraction between the first magnet and the second magnet is adjustable based on selection of the thickness of the portion of the first bumper casing disposed between the first magnet and the engagement surface of the first bumper casing. Alternatively, the force of magnetic attraction between the first magnet and the second magnet is adjustable based on selection of the thickness of the portion of the second bumper casing disposed between the second magnet and the engagement surface of the second bumper casing.

In some embodiments, the engagement surface of the first bumper casing has a convex shape and the engagement surface of the second bumper casing has a concave shape that substantially matches the convex shape of the first bumper casing. In other embodiments, the engagement surface of the first bumper casing has a concave shape and the engagement surface of the second bumper casing has a convex shape that substantially matches the concave shape of the first bumper casing.

Some embodiments described herein are directed to a magnetic closure bumper assembly for use in conjunction with a movable structure that engages a stationary structure. The magnetic bumper assembly comprises a first closure bumper and a second closure bumper. The first closure bumper includes a first bumper casing in which a magnet is disposed. The first bumper casing has a mounting surface and an engagement surface opposing the mounting surface. The mounting surface is configured for attachment to the movable structure or to the stationary structure. The second closure bumper includes a second bumper casing in which a ferromagnetic structure is disposed. The second bumper casing has a mounting surface and an engagement surface opposing the mounting surface. The mounting surface is configured for attachment to the stationary structure or to the movable structure. The magnetic attraction between the magnet and the ferromagnetic structure causes the first closure bumper to be attracted to the second closure bumper, thereby urging the engagement surface of the first bumper casing to removably contact the engagement surface of the second bumper casing as the movable structure is moved toward the stationary structure.

BRIEF DESCRIPTION OF THE DRAWINGS

Further advantages of the invention are apparent by reference to the detailed description in conjunction with the figures, wherein elements are not to scale so as to more clearly show the details, wherein like reference numbers indicate like elements throughout the several views, and wherein.

DETAILED DESCRIPTION

Embodiments described herein are directed to a small, low-profile system of magnetic closure bumpers. In some embodiments, the magnetic closure bumpers are attached to a movable structure that engages a stationary structure, such as a door and frame of a cabinet. The closure bumpers generally comprise one or more magnets and/or ferromagnetic materials encased in a relatively soft casing material allowing for a tight, quiet fit. Such casing materials might include polyurethane or other materials with such desirable properties.

Figure 1A:
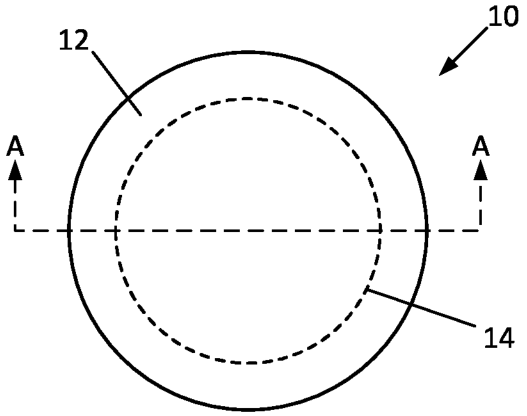
FIG. 1A depicts a front view of a magnetic closure bumper according to a first embodiment of the invention.
Figure 1B:
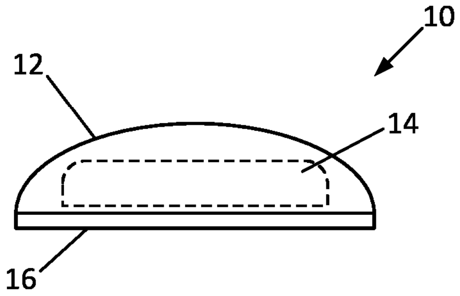
FIG. 1B depicts a side view of a magnetic closure bumper according to the first embodiment of the invention.
Figure 1C:
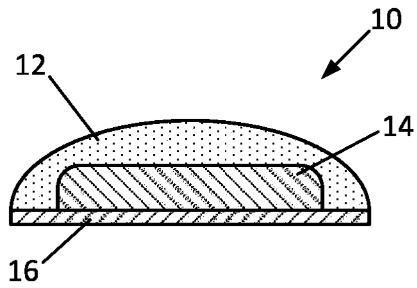
FIG. 1C depicts a cross section view of a magnetic closure bumper according to the first embodiment of the invention.

FIGS. 1A-1C and 2A-2C depict two embodiments of magnetic closure bumpers 10. As shown in FIGS. 1A-1C, a first embodiment comprises a bumper casing 12 having a semielliptical shape. A magnet 14 is disposed within the bumper casing 12. Preferably, the magnet 14 has a cylindrical puck shape, although other shapes are possible and may be preferable with other casing shapes. This embodiment includes an adhesive layer 16—such as a double-sided peel-and-stick adhesive—for attaching the bumper casing 12 to the movable or stationary structure.

Figure 2A:
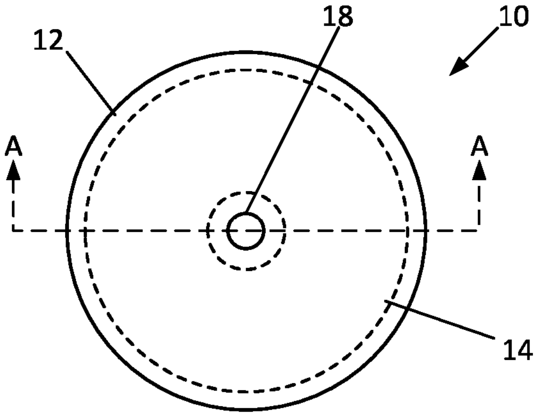
FIG. 2A depicts a front view of a magnetic closure bumper according to a second embodiment of the invention.
Figure 2B:
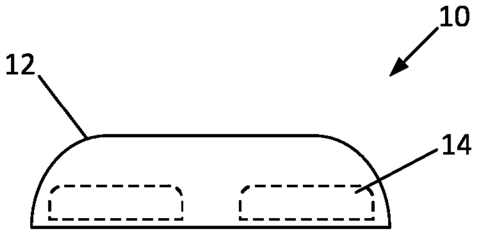
FIG. 2B depicts a side view of a magnetic closure bumper according to the second embodiment of the invention.
Figure 2C:
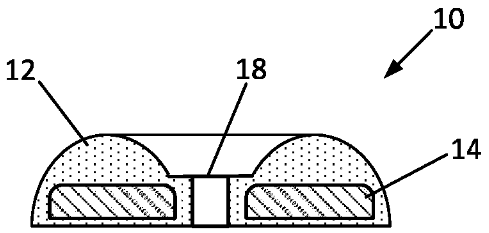
FIG. 2C depicts a cross section view of a magnetic closure bumper according to the second embodiment of the invention.

As shown in FIGS. 2A-2C, a second embodiment comprises a bumper casing 12 having a semi-toroidal shape. A magnet 14 disposed within the bumper casing 12 preferably has a shallow annular shape, such as a washer shape, although other shapes are possible and may be preferable with other casing shapes. This embodiment includes a central aperture 18 passing through the casing 12 for receiving a bolt, screw, nail, rivet, or other similar fastener for attaching the bumper casing 12 to the movable or stationary structure.

Figure 3:
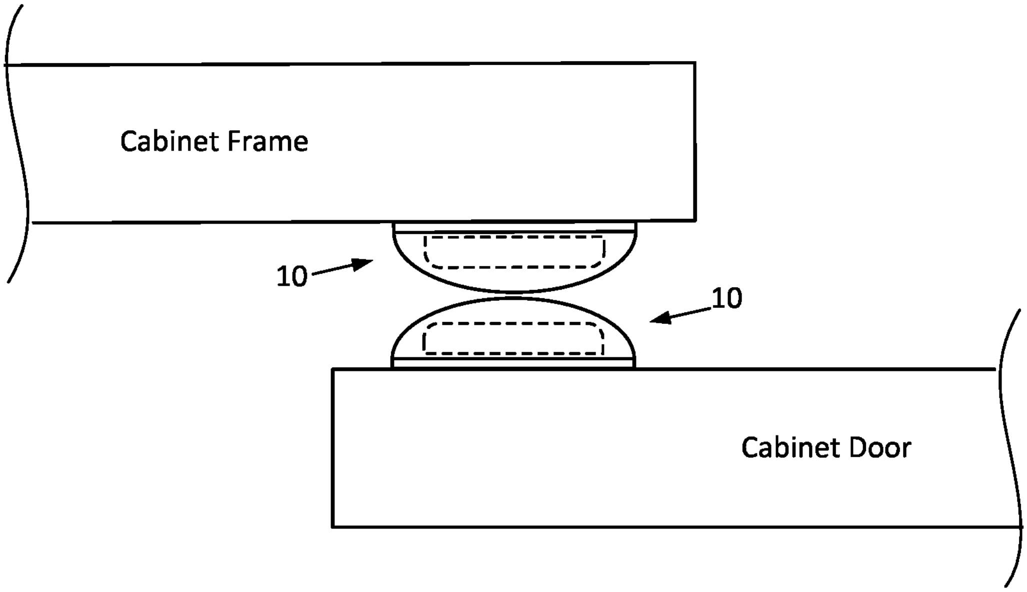
FIG. 3 depicts a magnetic closure bumper assembly attached to a cabinet frame and door according to an embodiment of the invention.

FIG. 3 depicts a pair of magnetic closure bumpers 10 attached to the frame and door of a cabinet. It will be appreciated that magnetic attraction between oppositely polarized magnets 14 causes the closure bumper 10 on the cabinet door to be attracted to the closure bumper 10 on the cabinet frame, thereby urging the engagement surface of each bumper casing 12 to removably contact the engagement surface of the other bumper casing 12 as the door is moved toward the frame. As shown in FIG. 3, it is preferable for the two bumpers 10 to be substantially aligned with each other when the door is in a closed position against the frame. This ensures that the magnetic force of attraction between the two bumpers 10 is maximized.

If the magnetic force of attraction between the two magnets 14 is properly adjusted, the force will be sufficient for the bumpers 10 to attract and engage each other without an undesirable bounce upon contact. The force of magnetic attraction upon contact may be adjusted based on selection of the thickness of the portion of the bumper casing 12 disposed between the magnet 14 and the engagement surface of the bumper casing. In preferred embodiments, a kit of bumpers 10 may be available to a consumer that includes bumpers having various thicknesses of casing material between the engagement surface and the magnet. In this way, the consumer may select a pair of bumpers 10 having the optimal combination of casing thicknesses for a particular application.

As the term is used herein, a ferromagnetic structure is a structure that contains or consists of a ferrous material or other material that is attracted to a magnet by magnetic force. As will be appreciated by one of ordinary skill in the art, a ferromagnetic material is a material having the same kind of magnetism as iron, such as a material that has high magnetic permeability and appreciable residual magnetism and hysteresis, or that possesses magnetization in the absence of an external magnetic field.

In an alternative embodiment, the magnet 14 in one of the two magnetic closure bumpers 10 shown in FIG. 3 is replaced by a ferromagnetic structure which may have substantially the same shape as the magnet. In this embodiment, the magnetic closure bumper 10 containing the magnet 14 may be attached to the frame and the magnetic closure bumper 10 containing the ferromagnetic structure may be attached to the door. Alternatively, the magnetic closure bumper 10 containing the ferromagnetic structure may be attached to the frame and the magnetic closure bumper 10 containing the magnet 14 may be attached to the door.

Typical existing bumper technologies create a closure that leaves a cabinet door slightly ajar due to the protrusion of the bumper. To cure this problem, each of the magnetic closure bumpers 10 depicted in FIG. 3 may be disposed in a recess in the surface of the door or in the surface of the frame or both. In this manner, the magnetic closure bumpers 10 are configured such that they are flush or nearly flush with the surface of the cabinet frame and/or door, so as to create a more complete closure between the frame and the door.

Some embodiments of the magnetic closure bumpers 10 are configured to incorporate a male/female design, wherein the forward surface of the bumper casing 12 on the frame (or door) has a convex (or concave) shape and the forward surface of the opposing bumper casing 12 on the door (or frame) has a matching concave (or convex) shape.

The foregoing description of preferred embodiments for this invention have been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

The invention claimed is:

1. A magnetic closure bumper assembly for use in conjunction with a movable structure that engages a stationary structure, the magnetic bumper assembly comprising:

- a first closure bumper comprising:
  - a first bumper casing having a mounting surface configured for attachment to the movable structure or to the stationary structure and an engagement surface opposing the mounting surface, wherein the engagement surface of the first bumper casing has a convex shape; and
  - a first magnet disposed within the first bumper casing; and
- a second closure bumper comprising:
  - a second bumper casing having a mounting surface configured for attachment to the stationary structure or to the movable structure and an engagement surface opposing the mounting surface, wherein the engagement surface of the second bumper casing has a concave shape that substantially matches the convex shape of the first bumper casing; and a second magnet disposed within the second bumper casing, wherein magnetic attraction between the first and second magnets causes the first closure bumper to be attracted to the second closure bumper, thereby urging the engagement surface of the first bumper casing to removably contact the engagement surface of the second bumper casing as the movable structure is moved toward the stationary structure.

2. The magnetic closure bumper assembly of claim 1 wherein one or both of the first and second bumper casings have a semi-elliptical shape and one or both of the first and second magnets have a cylindrical shape.

3. The magnetic closure bumper assembly of claim 1 wherein one or both of the first and second bumper casings have a semi-toroidal shape and one or both of the first and second magnets have an annular shape.

4. The magnetic closure bumper assembly of claim 1 wherein the first and second bumper casings are formed from polyurethane.

5. The magnetic closure bumper assembly of claim 1 wherein the first magnet is embedded within the first bumper casing, and the second magnet is embedded within the second bumper casing.

6. The magnetic closure bumper assembly of claim 1 wherein a force of magnetic attraction between the first magnet and the second magnet is adjustable based on selection of a thickness of a portion of the first bumper casing disposed between the first magnet and the engagement surface of the first bumper casing, or based on selection of a thickness of a portion of the second bumper casing disposed between the second magnet and the engagement surface of the second bumper casing.

7. The magnetic closure bumper assembly of claim 1 wherein the mounting surface of the first bumper casing is configured to attach to a door or a drawer and the mounting surface of the second bumper casing is configured to attach to a door frame or a drawer frame.

8. A magnetic closure bumper assembly for use in conjunction with a movable structure that engages a stationary structure, the magnetic bumper assembly comprising:

a first closure bumper comprising:

a first bumper casing having a mounting surface configured for attachment to the movable structure or to the stationary structure and an engagement surface opposing the mounting surface, wherein the engagement surface of the first bumper casing has a convex shape or a concave shape; and a magnet disposed within the first bumper casing; and a second closure bumper comprising:

a second bumper casing having a mounting surface configured for attachment to the stationary structure or to the movable structure and an engagement surface opposing the mounting surface, wherein the engagement surface of the second bumper casing has:

a concave shape that substantially matches the convex shape of the first bumper casing, or a convex shape that substantially matches the concave shape of the first bumper casing; and a ferromagnetic structure disposed within the second bumper casing, wherein magnetic attraction between the magnet and the ferromagnetic structure causes the first closure bumper to be attracted to the second closure bumper, thereby urging the engagement surface of the first bumper casing to removably contact the engagement surface of the second bumper casing as the movable structure is moved toward the stationary structure.

9. A magnetic closure bumper kit for use in conjunction with a movable structure that engages a stationary structure, the magnetic closure bumper kit comprising:

a first closure bumper comprising:

a first bumper casing having a mounting surface configured for attachment to the movable structure and an engagement surface opposing the mounting surface; and a first magnet disposed within the first bumper casing, wherein a portion of the first bumper casing disposed between the first magnet and the engagement surface of the first bumper casing has a first thickness;

a second closure bumper comprising:

a second bumper casing having a mounting surface configured for attachment to the movable structure and an engagement surface opposing the mounting surface; and a second magnet disposed within the second bumper casing, wherein a portion of the second bumper casing disposed between the second magnet and the engagement surface of the second bumper casing has a second thickness that is different from the first thickness; and a third closure bumper comprising:

a third bumper casing having a mounting surface configured for attachment to the stationary structure and an engagement surface opposing the mounting surface; and a third magnet disposed within the third bumper casing, wherein attachment of the first closure bumper to the movable structure provides for magnetic attraction between the first and third magnets as the movable structure moves toward the stationary structure, which causes the first closure bumper to be attracted to the third closure bumper, thereby urging the engagement surface of the first bumper casing to removably contact the engagement surface of the third bumper casing, or wherein attachment of the second closure bumper to the movable structure provides for magnetic attraction between the second and third magnets as the movable structure moves toward the stationary structure, which causes the second closure bumper to be attracted to the third closure bumper, thereby urging the engagement surface of the second bumper casing to removably contact the engagement surface of the third bumper casing, and wherein, due at least in part to the difference between the first thickness and the second thickness, a force of magnetic attraction between first closure bumper and the third closure bumper is different from a force of magnetic attraction between second closure bumper and the third closure bumper.

10. A method for using the magnetic closure bumper kit of claim 9, comprising:

(a) making the magnetic closure bumper kit available to a consumer;

(b) the consumer attaching the third closure bumper to the stationary structure; and (c) the consumer selecting either the first closure bumper or the second closure bumper for attachment to the movable structure, wherein the force of magnetic attraction between the third closure bumper and the first or second closure bumper selected in step (c) is sufficient for attraction and engagement without an undesirable bounce upon contact.

* * * * *